United States Patent
Corfield

(10) Patent No.: US 10,652,309 B2
(45) Date of Patent: May 12, 2020

(54) MECHANISM TO ALLOW A MESSAGING SYSTEM TO AUTOMATICALLY SWITCH TO ASYNCHRONOUS OPERATION DUE TO HIGH DEMAND

(71) Applicant: FinancialForce.com, inc., San Francisco, CA (US)

(72) Inventor: Richard Corfield, Harrogate (GB)

(73) Assignee: FINANCIALFORCE.COM, INC., San Francisco, CA (US)

(*) Notice: Subject to any disclaimer, the term of this patent is extended or adjusted under 35 U.S.C. 154(b) by 88 days.

(21) Appl. No.: 15/708,492

(22) Filed: Sep. 19, 2017

(65) Prior Publication Data

US 2019/0089766 A1  Mar. 21, 2019

(51) Int. Cl.
| | | |
|---|---|---|
| H04L 29/08 | (2006.01) | |
| H04L 12/861 | (2013.01) | |
| H04L 12/835 | (2013.01) | |

(52) U.S. Cl.
CPC ........... *H04L 67/06* (2013.01); *H04L 47/30* (2013.01); *H04L 49/90* (2013.01); *H04L 67/1097* (2013.01); *H04L 69/329* (2013.01)

(58) Field of Classification Search
None
See application file for complete search history.

(56) References Cited

U.S. PATENT DOCUMENTS

| | | | |
|---|---|---|---|
| 7,853,676 B1* | 12/2010 | Freskos | H04L 41/0266 709/201 |
| 10,467,218 B2* | 11/2019 | Willcock | G06F 16/283 |
| 2006/0074911 A1* | 4/2006 | Neagovici-Negoescu | G06F 16/95 |
| 2010/0169130 A1* | 7/2010 | Fineman | G06Q 10/02 705/5 |
| 2011/0153589 A1* | 6/2011 | Vaitheeswaran | G06F 16/35 707/709 |
| 2013/0132394 A1* | 5/2013 | Puzicha | G06Q 10/103 707/737 |
| 2015/0142846 A1* | 5/2015 | Levine | G06F 16/258 707/769 |
| 2017/0372246 A1* | 12/2017 | Storey | H04L 67/10 |
| 2018/0082241 A1* | 3/2018 | Willcock | G06Q 10/06311 |

* cited by examiner

*Primary Examiner* — Thomas J Dailey
(74) *Attorney, Agent, or Firm* — Perkins Coie LLP; Michael A. Glenn

(57) ABSTRACT

An embodiment can include a method and one system comprising receiving documents, via a processor, the documents having a source application and a destination application and generating one or more chunks including the documents. The method and system can include determining a destination threshold of the destination application representing a maximum volume the destination application can receive in a timeframe. The method and system can further determine using one or more characteristics of the destination application and attributes of the one or more chunks that the maximum volume was not reached in the timeframe. The method and system can transmit the one or more chunks to the destination application.

24 Claims, 7 Drawing Sheets

MECHANISM TO ALLOW A MESSAGING SYSTEM TO AUTOMATICALLY SWITCH TO ASYNCHRONOUS OPERATION DUE TO HIGH DEMAND

TECHNICAL FIELD

The disclosed teachings generally relate to systems and methods for document processing. The disclosed teachings more particularly relate to systems and methods for dynamically deferring document processing to allow for processing large volumes of documents in the SALESFORCE® platform.

BACKGROUND

Cloud platforms such as the SALESFORCE platform allow for sending communication between applications sharing processing resources and data in a multi-tenant network that offers computing services on-demand to customers. The SALESFORCE platform may provide communication between numerous applications within an environment that provides an interface for case management and task management, and a system for automatically handling events.

The SALESFORCE platform can facilitate sending thousands, millions, hundreds of millions, or even billions of records while optimizing the performance of data loads and integration into a company's services. Certain contexts in the SALESFORCE platform may receive no more than 50,000 data records ("records") per request. As such, 10 separate and sequential requests would be required to receive 1,000,000 data records. Thus, any process or approach that would allow for efficiently sending large volumes of records (e.g., greater than 100,000) is valuable in cloud-based platforms such as the SALESFORCE platform.

SUMMARY

Introduced herein is a technique that can include at least one method and at least one system. An embodiment can include a method comprising receiving a document via a processor, the document having a source application and a destination application and generating one or more chunks, including the document. The method can include determining a destination threshold of the destination application representing a maximum volume the destination application can receive in a timeframe. From the one or more characteristics of the destination application and the attributes of the one or more chunks, it can be determined that the maximum volume was not reached in the timeframe. The method can further include transmitting the one or more chunks to the destination application.

An embodiment can include an electronic device comprising a processor and memory storing instructions, wherein the processor is configured to execute the instructions such that the processor and memory are configured to receive a document, the document having a source application and a destination application. The electronic device can generate one or more chunks including the document, determine a destination threshold of the destination application representing a maximum volume the destination application can receive in a timeframe, determine using one or more characteristics of the destination application and attributes of the one or more chunks that the maximum volume was not reached in the timeframe, and transmit the one or more chunks to the destination application.

DETAILED DESCRIPTION

Figure 1:
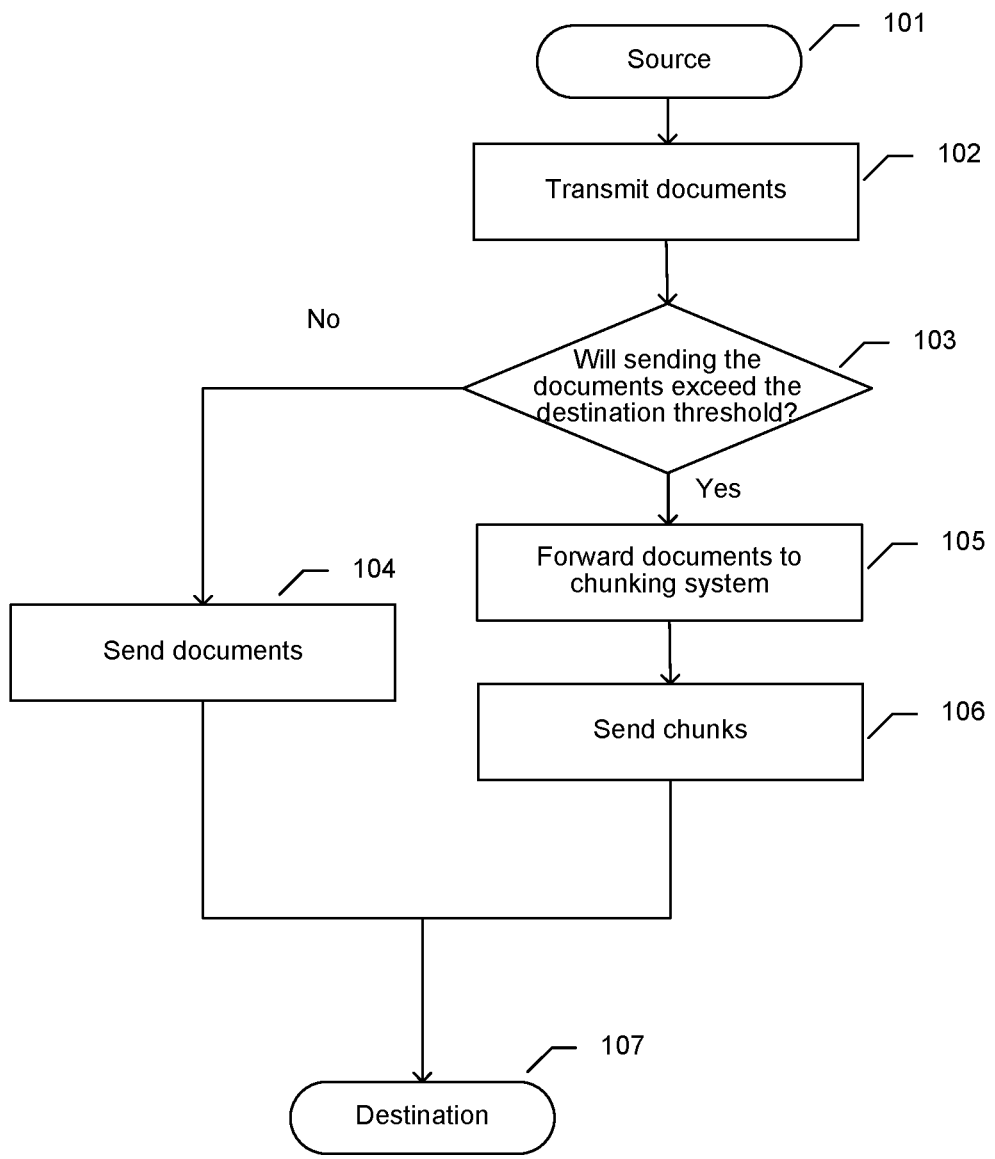
FIG. 1 illustrates a workflow of an embodiment of the asynchronous messaging system having a chunking system.

The embodiments set forth below represent the necessary information to enable those skilled in the art to practice the embodiments, and they illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing the embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof.

Processing large volumes of documents (or records) requires a complex scalable computing infrastructure that is cost-prohibitive to many businesses. As such, businesses turn to cloud computing to use a shared pool of configurable computing resources that provide scalable services for many applications. An example of a cloud-based platform includes the SALESFORCE platform. FINANCIALFORCE is a cloud enterprise resource planning (ERP) system built on Force.com, a cloud computing SALESFORCE platform.

The ERP system can supply applications such as billing, human resource, accounting, supply chain management, customer relationship management, revenue recognition, and more. Documents can be sent between the applications.

The documents being sent can include a large volume of documents (e.g., 5 documents, 10 documents, 100 documents, 1,000 documents, etc.). For example, the human resource application may need to transmit 100 documents to the accounting application. In the example, the accounting application can only handle 10 documents per request, and the human resource application is configured to split the document into 10 batches of 10 documents (100 total documents).

In some examples, the receiving application may have a threshold limit of the number of documents it can receive in a time period or timeframe. For example, the human resource application may only be able to receive and process twenty documents in a two-second window. Each receiving application may have a different destination threshold, and therefore, each sending application may need to be configured to send the threshold amount of documents the receiving application can process per request. In at least one embodiment, the receiving applications have the same destination threshold.

However, the solution of limiting the number of documents or messages which a sending application may send in the two-second window may still result in the receiving application receiving more than the threshold amount. For example, if the human resource application is only able to receive ten documents in a two-second window, and both the accounting and the project management applications send ten documents each in that two-second window, then the human resource system will receive twenty documents in the two-second window. The receiving application receiving more documents than the threshold amount may result in the documents not being received, and the sending application may need to resend the documents to the receiving application, which may result in unnecessary slowdown of the network. In some examples, the receiving application can fail if more documents are received than allowed by the threshold. The threshold can be the number of documents per execution context (number of requests per transaction). In some embodiments the threshold is document lines.

FIG. 1 illustrates a workflow of an embodiment of the synchronous messaging system having a chunking system. A chunking system can be a delivery planning system responsible for managing the transmission of documents to applications by grouping documents or parts of documents into groups or chunks. A chunk size can match the destination threshold. For example, when a destination threshold is 10 documents per request, the chunk size can be set to a group of 10 documents. Chunking can allow inconveniently large messages to be broken into conveniently-sized smaller "chunks."

A documents can be transmitted 102 from a source 101. At step 103, the messaging system may determine the destination of the documents and whether sending the documents exceeds the threshold of the destination 107. The messaging system can store characteristics of the destination application. The characteristics can include a volume or count of documents that can be received by the destination per execution context.

In some embodiments, the characteristics can include the data size of the one or more documents received, timestamp of the document receipt and/or the relevant time period of the destination threshold (e.g., 10 milliseconds, 1 second, 1 minute, etc.). In some embodiments, the characteristics of the destination are only stored for the period relevant to the destination threshold. For example, if the destination threshold of a destination is 512 bytes per 120 seconds, then the relevant period can be determined to be current time (T)— 120 seconds. In the instant example, the information about documents sent more than 120 seconds before current time will not be stored in the characteristics of the destination. In some embodiments the period of the relevant time is a request. For example, it can be determined that the destination threshold is 10 documents per request, and therefore, if the number of documents being sent is 20, then it can be determined that sending those document would exceed the destination threshold.

In some embodiments, the data size of the one more documents received is determined by the number of lines in the one or more documents. The characteristics can also include the timestamp of the document receipt and/or the relevant time period of the destination threshold (e.g., 10 milliseconds, 1 second, 1 minute, etc.). In some embodiments, the characteristics of the destination are only stored for the period relevant to the destination threshold. For example, if the destination threshold of a destination is 100 lines per 120 seconds, then the relevant period can be determined to be current time (T)—120 seconds. In the instant example, the information about documents sent more than 120 seconds before current time will not be stored in the characteristics of the destination. In an embodiment, a determination is made on whether sending the document will exceed the destination threshold 103. In some embodiments the period of the relevant time is a request. For example, it can be determined that the destination threshold is 10 lines per request, and therefore, if the number of lines being sent is 20 total (2 documents of 10 lines each), then it can be determined that sending those document would exceed the destination threshold.

In an embodiment, a determination is made on whether sending the document will exceed the destination threshold 103. Characteristics of the determination step may include the runtime of the determination step. For example, if the destination threshold is 10 documents per 950 milliseconds, one document is being transmitted 102, and the processing time of the determination step 103 is 100 milliseconds. The characteristics of the destination is ten documents, including five of the ten documents sent at current time (T)—950 milliseconds. In the example, the messaging system can look at only T—(950-100) milliseconds because the processing time of the determination step 103 is 100 milliseconds. In the example, the messaging system can determine that only 5 documents were sent because by the time the determination step 103 completes, only 5 documents would have been sent in the relevant time frame.

In at least one embodiment, characteristics of the determination step are dynamic and are updated to the average time of execution of the determination step. The characteristics of the determination step can be the average time of execution of the determination step in a period of time (e.g., an hour, 24 hours, a month, a year, etc.). In at least one embodiment, characteristics of the determination step are the median of the times of execution of the determination step. The characteristics of the determination step can also be set to the mode of the times of execution of the determination step. In at least one embodiment, the characteristic of the determination step can be the highest time of execution of the determination step.

In an embodiment, a messaging system can be configured to detect the number of documents being sent to an application and send the documents to a chunking system when it is detected that the receiving threshold is reached. The chunking system can be a delivery planning system. The system can determine whether sending the document to the destination would exceed the destination threshold. This can be determined by the number of documents sent to the destination at one time and/or in a time period. If the destination threshold is 1,000 documents per second, then the characteristics of the destination, and the destination threshold can be analyzed to determine whether sending the document directly to the destination would exceed the destination threshold. For example, if the destination threshold is 1,000 documents per second, and the messaging system count of the documents sent to the destination in the last second is 100 documents, then the messaging system at step 103 determines that the destination threshold has not been reached.

In some embodiments, the destination threshold is measured in the size of data which can be received per request. For example, if the threshold is two gigabytes of data per execution context, then documents totaling three gigabytes can be determined to exceed the destination threshold if sent as one transaction. In another example, if the threshold is 1,000 lines a per execution context, then documents totaling 10,000 lines can be determined to exceed the destination threshold if sent as one transaction. In at least one embodiment the threshold can be set to eight megabytes per execution context.

In some examples, the destination threshold is measured by the size of data which can be received per time period, such as two gigabytes per second The messaging system can store characteristics about the destination such as the size of data sent to the destination and associated timestamps indicating when the data was sent. In some embodiments, determining whether sending the document to the destination would exceed the destination threshold includes determining the total size of data sent to the destination in a time period. If the destination threshold is two gigabytes per second, the messaging system can keep a count of the size of data sent to the destination in the last second, then determine the document size and whether sending the document directly to the destination would exceed the destination threshold. For example, if the destination threshold is 2 gigabytes per second, the document being sent is 15 bytes, and the count is 1 gigabyte, then the messaging system at step 103 can determine that the destination threshold would not be exceeded if the document was sent directly to the destination.

In some embodiments, the size of data can include the total number of lines in one or more documents, and the destination threshold can be measured by the number of lines which can be received per time period, such as 100 lines per second. In an example, the determination of whether sending the document to the destination would exceed the destination threshold includes determining the total size of data (e.g., total number of lines) sent to the destination in a time period. The number of lines can be counted as the total number of lines in a document. For example, the size of data (number of lines) of 100 documents being transmitted with 10 lines is 1,000 lines. In another example the size of data of one document with 1,000 lines being transmitted is 1,000 lines. If the destination threshold is 100 lines per second, the messaging system can keep a count of the size of data (e.g., number of lines) sent to the destination in the last second, then determine the size of documents being sent and whether sending the documents directly to the destination would exceed the destination threshold. For example, if the destination threshold is 100 lines per second, the document being sent is 80 lines, and the count is 10 lines, then the messaging system at step 103 can determine that the destination threshold would not be exceeded if the document was sent directly to the destination. In some embodiments the destination threshold can be measured by the number of lines per one transaction (e.g., sent at one time).

In at least one embodiment, the characteristics of the determination step are a factor in step 103. The count size of the data sent to the destination and the associated timestamp can be stored. Furthermore, in some embodiments, only information about the relevant time period can be stored. In some embodiments, determining whether sending the document to the destination would exceed the destination threshold includes determining the total size of data sent to the destination in a time period. It can also include the characteristics of step 103 such as processing time. For example, if the destination threshold is 1 gigabyte per second, the transmitted document 102 is 128 bytes, the characteristic of step 103 is 100 milliseconds, and the count includes 5 of the 10 documents totaling the size of 0.5 gigabytes sent at current time (T)—950 milliseconds, then the messaging system will determine that 0.5 gigabytes were sent and that the destination threshold was not reached.

In some embodiments, once it is determined that sending the documents will exceed the destination threshold, the documents can be forwarded to a chunking system 105. The chunking system can queue the one or more documents and transmit the one or more documents in manageable chunks. In some embodiments, the manageable chunks are groupings of documents which can be received by the destination without exceeding the destination threshold. In an example, if a destination threshold is 10 documents per transmission and 20 documents are sent to the chunking system, the chunking system can group the 20 documents into 2 groups of 10 and transmit them to the destination individually. In an example, if a destination threshold is 100 lines per transmission and 20 documents, one 10 lines each, are sent to the chunking system, the chunking system can group the 20 documents into 2 groups of 100 lines each and transmit them to the destination individually. In at least one embodiment, the document can be split up. For example, if the threshold is 100 lines per transmission and the document to be sent is 200 lines then the document can be split into two parts of 100 lines each. In at least one embodiment, when a document is split the parts are associated with a priority. For example if the part with the first 100 lines of the document can be given higher priority than the part with the second half of the document. The higher priority part can be transmitted before the lower priority part.

In some embodiments, where the destination threshold includes a number of documents or size of transaction per time period, the chunking system can queue one or more documents and monitor the characteristics of the destination to determine when to forward the documents 106. Monitoring the characteristics of the destination can include monitoring the characteristics of the destination in association with the destination threshold and/or determination step 103.

In at least one embodiment, the chunking system is notified by step 103 when the determination is made that the documents are sent 104 to the destination. In an embodiment, the determination step 103 updates the characteristics of the destination to account for the document being sent 104 to the destination. For example, if the destination threshold is 10 documents per minute and the characteristics of the destination show that 5 documents have been received in the relevant time period, the determination step 103 can send an update request to the destination characteristics when forwarding a document to the destination. In another example, if the destination threshold is 10 documents per minute, and the characteristics of the destination show that 5 documents have been received in the relevant time, the determination step 103 can send a notification to the chunking system when forwarding a document to the destination. In at least one embodiment, the determination step 103 does not send a notification to the chunking system and/or does not update the destination characteristics. In some embodiments, the destination characteristics are updated when a document is received at the destination.

In at least one embodiment, when the chunking system receives a document, it sends a message to the source application to notify the sender that the document was received by the chunking system. Notifying the sender can include notifying the sender with an estimated delivery time to the destination. In at least one embodiment, notifying the sender can include notifying the sender that a message is sent, deferred (e.g., not yet sent), and/or an error occurred. In at least one embodiment, the chunking system places the documents into a queue. The chunking system may include one or more queues. In at least one embodiment, the chunking system can include one queue per destination application. That is, each destination application can be associated with its own corresponding queue. Thus, if there are three destination applications, then each of those three destinations applications would be associated with a unique queue. This results in three queues in the chunking system.

Furthermore, in at least one embodiment, the chunking system may include a bucket priority queue per destination application. For example, a bucket priority queue associated with the billing application can prioritize documents received from the human resource application over documents received from the accounting application. This can result in a document from the human resource application to be sent to the billing application before a document received from the accounting application while both documents are within or associated with the bucket priority queue. Priority can include one or more of very high, high, medium, and low. In at least one embodiment, the bucket priority queue includes a different priority for each sending application. In some embodiments, some sending applications may have the same priority as other sending applications. For example, the priority associated with the human resource application and the accounting application can be set to the same priority. The chunking system can store the documents received from both applications in a bucket of records having the same priority as each other. The priority can also be defined by the document. In at least one embodiment, the documents can be queued and/or prioritized by topics and/or document types. For example, documents having a topic type of "publication" can have an assigned priority of "high" and can be stored in a priority bucket associated with high priority documents.

The chunking system can transmit one or more documents to one or more destination applications. The chunking system can separate the documents into chunks. Each chunk can match the destination threshold number of documents and/or size of documents. For example, if the receiving application has a threshold of ten documents then the chunk size can be set to ten documents. In the example, if 100 documents are stored in a queue by the chunking system, the 100 documents can be grouped into 10 chunks of 10 documents. In another example, if the threshold is 100 kilobytes, the chunk size can be set to 100 kilobytes. In some embodiments, the chunk size can be set to a size smaller than the destination threshold. The chunk size can be determined by selecting the lower of destination threshold and optimal network performance measure. The optimal network performance measure can include the size, bandwidth and/or throughput which can be transmitted without impacting network performance.

Figure 2:
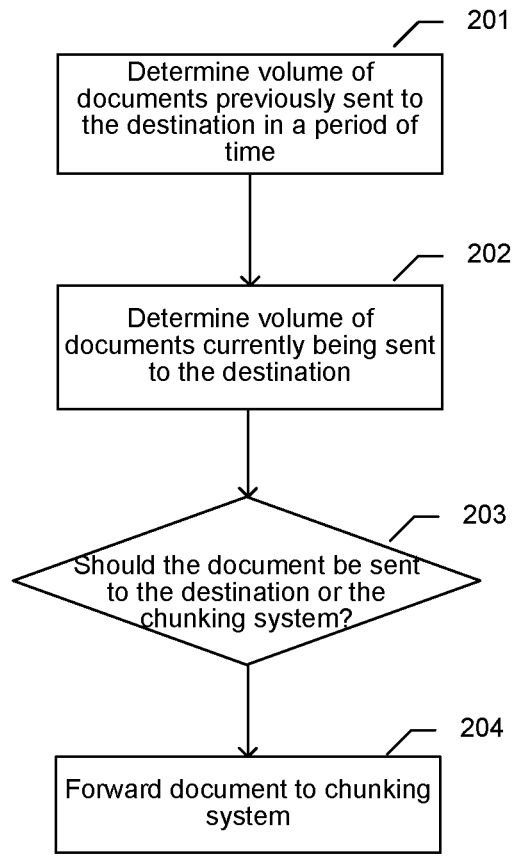
FIG. 2 illustrates an embodiment of the messaging system determining whether to transmit the document to the chunking system.

FIG. 2 illustrates an embodiment of the messaging system determining whether to transmit the document to the chunking system. At step 201, the characteristics of the destination are determined. The characteristics of the destination can include the volume of documents previously transmitted to the destination in the relevant period of time. At step 202, the characteristics of the chunking system are determined. The characteristics of the chunking system include the information about the one or more queues associated with the destination application, the priority information of the documents in the one or more queues, the priority information associated with the document, whether chunks are being prepared for transmission, and/or the time one or more chunks were sent.

The characteristics of the destination and/or the characteristics of the chunking system can be analyzed to determine at step 203 whether to transmit the document to the destination or the chunking system 204. The document's priority (e.g., low, medium, high, etc.) can be factored into whether to transmit the document. For example, if it is identified that the document is high priority, the destination threshold has not been reached, and the one or more queues associated with the destination do not include high priority documents, then it can be determined that the document should be transmitted to the destination and not to the chunking system. In another example, if it is identified that the document is high priority, the destination threshold has not been reached, and the one or more queues associated with the destination include high priority documents, then it can be determined that the document should be transmitted to the chunking system. In at least one embodiment, if the document is transmitted to the chunking system, a message can be sent to the source application indicating that the document transmission has been deferred. In at least one embodiment, the message delivery system can detect that a document was transmitted, however, no reply indicating the status of "sent" or "deferred" was sent; when this is identified, the message delivery system can transmit a failure notification to the source application.

Figure 3:
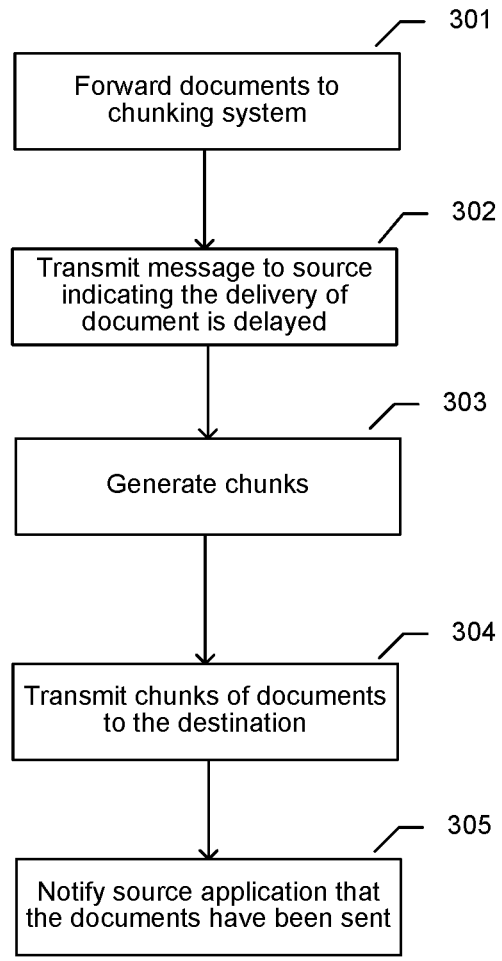
FIG. 3 illustrates the workflow of an embodiment of the chunking system.

FIG. 3 illustrates the workflow of an embodiment of the chunking system. In at least one embodiment, the one or more documents are received from the source without a determination being made as to whether to bypass the chunking system. In some embodiments, the document is transmitted to the chunking system after a determination to not bypass the chunking system. At step 301, the one or more documents are forwarded to the chunking system. The chunking system at step 302 can transmit a message to the source indicating the status of the one or more documents.

One or more chunks can be generated at step 303. Generating one or more chunks can include grouping documents having the same priority. It can also include determining that documents are sequential and need to be received in a specific order as defined by the document characteristics (e.g., indicate that the document must be received by the sender prior to another document). Document characteristics can include a document identification (ID) or correlation ID which can assist in identifying the document, priority information, and/or the relationship to another document. Furthermore, the sequential documents can be grouped into the same chunk or sequential chunks. In embodiments where documents are sequential, the chunking system can be configured to sequentially send the chunks in accordance to sequentiality of the documents. For example, if the document threshold is two documents per transmission and if documents A, B, and C are required to arrive at the destination in a sequential order then the chunking system can create a first chunk with documents A and B, and second chunk with document C. If documents A, B, C, D, and E are in the queue of the chunking system, are not documents which are identified as sequential documents and each chunk can hold three documents, then the chunking system can group the five documents into any combination such as one chunk having documents A, D, and E, and another chunk having documents B and C.

In some embodiments where the destination threshold is a data size such as 512 kilobytes per second, the chunk size can be restricted to a data size (e.g., 512 kilobytes of data per chunk). Therefore, when determining how to group the documents into chunks, the chunking system can group the documents based on optimal size. If non-asynchronous document A is 256 kilobytes, document B is 384 kilobytes, document C is 128 kilobytes, and document E is 258 kilobytes, then the system can determine the optimal grouping of the documents into chunks. The optimal grouping can include grouping documents so that the least amount of chunk space goes unused. Thus, the chunking system can determine that the optimal grouping of documents is document A and document E in one chunk, and document B and document C in another chunk.

In some embodiments where the destination threshold is a data size such as 1000 lines per transaction, the chunk size can be restricted to a data size (e.g., 1,000 lines per chunk). Therefore, when determining how to group the documents into chunks, the chunking system can group the documents based on optimal size. If document A is 750 lines, document B is 500 lines, document C is 500 lines, and document E is 250 lines, then the system can determine the optimal grouping of the documents into chunks. The optimal grouping can include grouping documents so that the least amount of chunk space goes unused. Thus, the chunking system can determine that the optimal grouping of documents is document A and document E in one chunk, and document B and document C in another chunk.

The chunks can be transmitted to the destination at step 304. In at least one embodiment the source application (e.g., sending application) can be notified when the document is sent to the destination 305. In at least one embodiment the transmission process (e.g., deliver call) includes a notification to the source application when the transmission process completes the task of sending. For example, once the chunking system initiates the transmission process to send the chunk to the recipient, the transmission process can transmit a "delivered" status to the source application once the transmission is complete.

Figure 4:
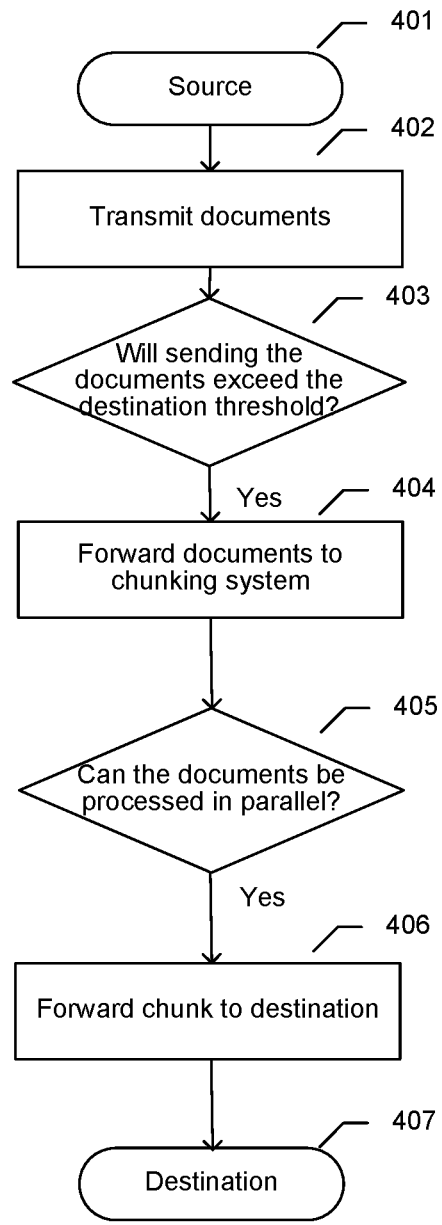
FIG. 4 illustrates an embodiment of the messaging system in a parallel processing environment.

FIG. 4 illustrates an embodiment of the messaging system in a parallel processing environment. The source 401 application can transmit one or more documents 402, the documents having a destination 407. At step 403, the messaging system can determine whether transmitting the one or more documents directly to the destination will exceed the destination threshold value at step 403. In at least one embodiment, the destination threshold is a volume of documents per request (i.e., 10 documents per request). If it is determined that transmitting the one or more documents to the destination 407 would exceed the destination threshold, then the one or more documents can be forwarded to the chunking system 404. At step 405, it can be determined whether the document can be processed in parallel with other documents. For example, if a document is sequential, then it may need to be received at the destination before and/or after another one or more documents. For example, if document A is marked as needing to be received before document B at the destination, then both documents A and B are sequential documents. In at least one embodiment, a database and/or a table is maintained by identifying which documents are sequential. The documents can be identified in the database and/or table by document ID and/or correlation ID.

In some embodiments, when the document size is larger than the destination threshold and/or chunk size, then the document can be split between two or more chunks. In some embodiments, the chunks having portions of a document can be marked as sequential chunks which need to be transmitted in an order. At step 406, if it is determined that a document and/or chunk is not sequential, the chunking system can forward the document and/or chunk to the destinations. If it is determined that one or more documents and/or chunk are sequential, the chunking system can determine that the sequential documents and/or chunks should not be sent in parallel. For example, if chunk A and chunk B are sequential chunks, and chunk C is not sequential, then the chunking system can transmit chunks A and B sequentially and chunk C in parallel to other chunks (including chucks A and B).

Figure 5:
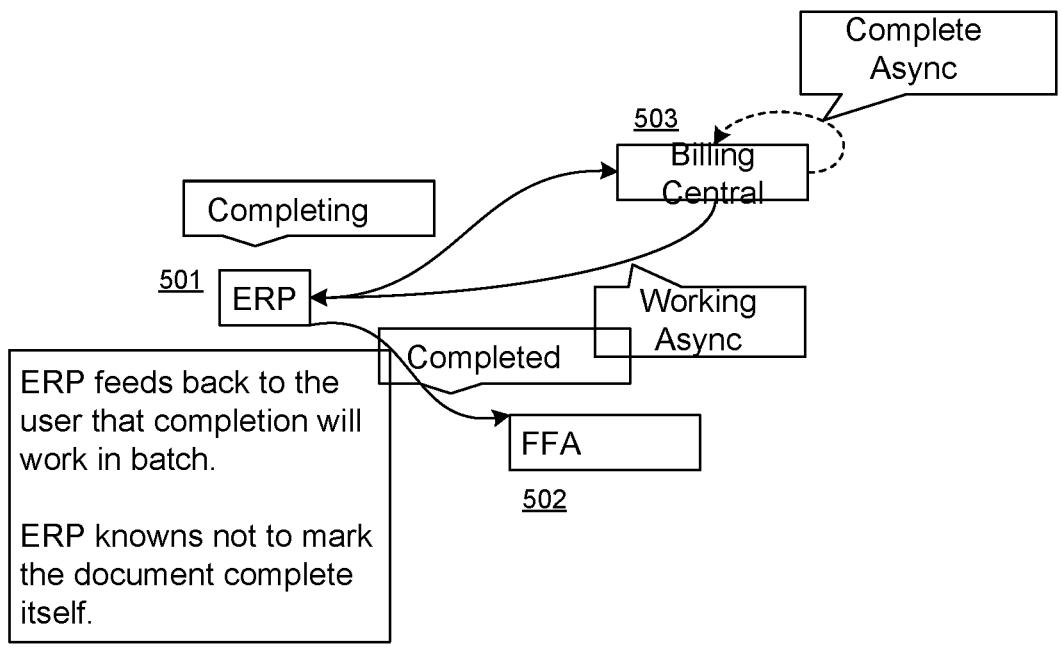
FIG. 5 describes an example workflow of the asynchronous messaging system.

FIG. 5 describes an example workflow of the asynchronous messaging system. The enterprise resource planning (ERP) system 501 can manage the transmission of documents between applications. In some embodiments, the billing central application 503 may not be able to handle receiving documents. When the application cannot receive documents, a message can be transmitted indicating that the documents directed to said application should be transmitted to the chunking system until the application becomes available to receive the documents. For example, if the billing system cannot receive documents, a message can be transmitted to the system of 501 indicating that documents should be deferred until the billing central application 503 becomes available. In some embodiments, when the system is notified that an application cannot receive documents, no documents are sent to that application until the system of 501 receives an update that the application can again receive documents. In at least one embodiment when documents are deferred via the chunking system, a request can be sent to the application to check whether it can receive documents.

In an example, the FFA application 502 can attempt to transmit one or more documents to the billing central application 503. The ERP system can determine that the one or more documents are sent to the chunking system and transmitted in a chunk or a batch. In at least one embodiment, the chunking system is a part of ERP. The ERP can send a message to the FFA application indicating that the one or more documents will be transmitted to the billing central (BC) application 503 at a later time. In at least one embodiment, a "deferred" status can be transmitted to the FAA application if the document intended for the billing central system is sent to the chunking system. In at least one embodiment, the ERP system does not mark the document as being delivered. After generating one or more chunks that include one or more documents, ERP can transmit the one or more chunks to the billing central application. ERP can notify FFA that the one or more documents were transmitted to billing central application. In at least one embodiment, billing central application can notify FFA that the one or more documents were received. Furthermore, billing central application can send a notification to ERP that the one or more documents were received. In at least one embodiment a "sent" or "completed" status can be transmitted to the FFA application once the document is sent from the chunking system to the billing central application. In one embodiment a "sent" or "completed" status can be transmitted to the system 501 once the document is sent from the chunking system to the billing central application. In at least one embodiment, the chunking system is a part of FFA.

Figure 6:
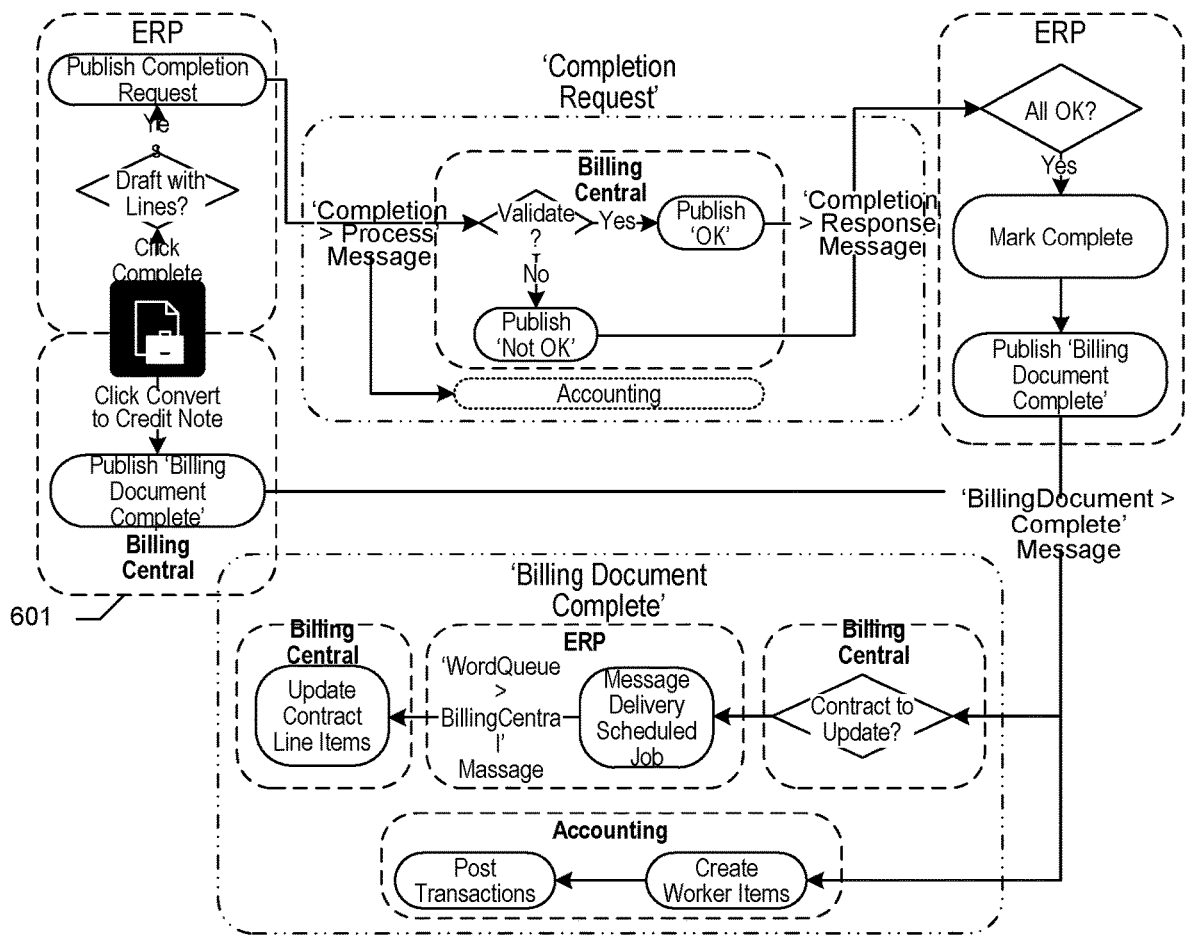
FIG. 6 demonstrates an example workflow of communication between two applications.

FIG. 6 demonstrates an example workflow of communication between applications. In the example, the ERP system receives a document publication request (e.g., request to send document) to the billing central application 601. In the example, the document is validated (e.g., verify whether billing central application can receive the document) by the billing central application to determine whether it is "ok" for publication (e.g., "ok" to send document). When it is determined that the billing central application can receive documents, the documents can be send to the billing central application. In some embodiments, when it is determined that the application such as the billing central application cannot receive documents, the documents can be transmitted to the chunking system. The chunking system can queue the documents until the billing central application can receive documents.

Figure 7:
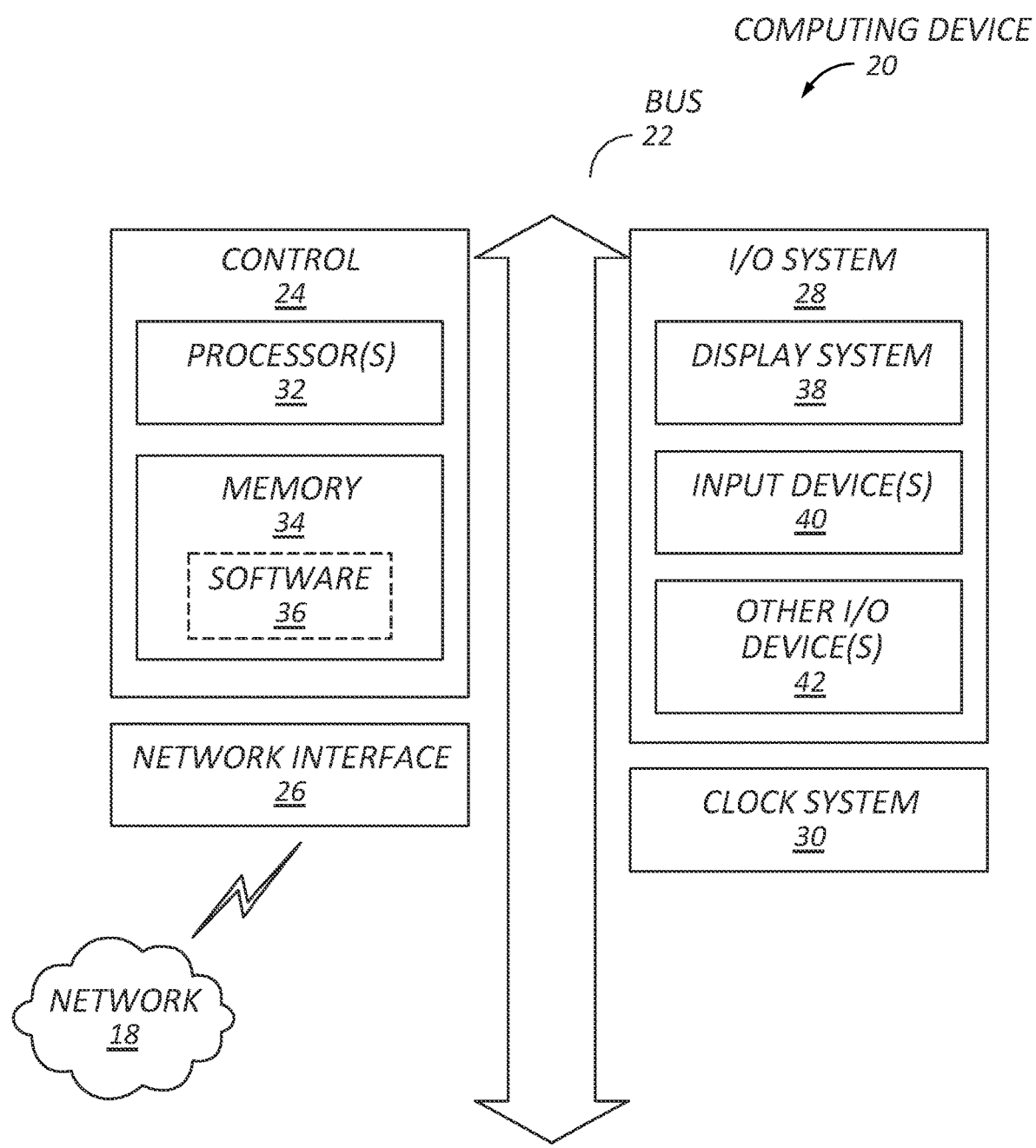
FIG. 7 is a block diagram illustrating a computing device that is operable to implement the disclosed technology according to some embodiments of the present disclosure.

FIG. 7 is a block diagram illustrating a computing device that is operable to implement the disclosed technology according to some embodiments of the present disclosure. As shown, a computing device 20 includes a bus 22 that is operable to transfer data between hardware components. These components include a control 24 (e.g., processing system), a network interface 26, an input/output (I/O) system 28, and a clock system 30. The computing device 20 may include other components that are not shown nor further discussed for the sake of brevity. One having ordinary skill in the art will understand any hardware and software that is included but not shown in FIG. 7.

The control 24 includes one or more processors 32 (e.g., central processing units (CPUs), application-specific integrated circuits (ASICs), and/or field programmable gate arrays (FPGAs)), and memory 34 (which may include software 36). For example, the memory 34 may include volatile memory (e.g., RAM) and/or non-volatile memory (e.g., read-only memory (ROM)). The memory 34 can be local, remote, or distributed.

A software program (e.g., software 36), when referred to as "implemented in a computer-readable storage medium," includes computer-readable instructions stored in the memory (e.g., memory 34). A processor (e.g., processor 32) is "configured to execute a software program" when at least one value associated with the software program is stored in a register that is readable by the processor. In some embodiments, routines executed to implement the disclosed embodiments may be implemented as part of OS software (e.g., MICROSOFT® WINDOWS® and LINUX®) or a specific software application, component, program, object, module, or sequence of instructions referred to as "computer programs."

As such, the computer programs typically comprise one or more instructions set at various times in various memory devices of a computer (e.g., computing device 20), which, when read and executed by at least one processor (e.g., processor 32), will cause the computer to perform operations to execute features involving the various aspects of the disclosed embodiments. In some embodiments, a carrier containing the aforementioned computer program product is provided. The carrier is one of an electronic signal, an optical signal, a radio signal, or a non-transitory computer-readable storage medium (e.g., memory 34).

The network interface 26 may include a modem or other interfaces (not shown) for coupling the computing device 20 to other computers over the network 18. The I/O system 28 may operate to control various other I/O devices 42, including peripheral devices such as a display system 38 (e.g., a monitor or touch-sensitive display), and one or more input devices 40 (e.g., a keyboard and/or pointing device). Other I/O devices 42 may include, for example, a disk drive, printer, scanner, or the like. Lastly, the clock system 30 controls a timer for use by the disclosed embodiments.

Operation of a memory device (e.g., memory 34), such as a change in state from a binary one (1) to a binary zero (0) (or vice versa), may comprise a visually perceptible physical change or transformation. The transformation may comprise a physical transformation of an article to a different state or thing. For example, a change in state may involve an accumulation and storage of charge or a release of stored charge. Likewise, a change of state may comprise a physical change or transformation in magnetic orientation or a physical change or transformation in molecular structure, such as a change from crystalline to amorphous or vice versa.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually effect the embodiments.

While the disclosure has been described in terms of several embodiments, those skilled in the art will recognize that the disclosure is not limited to the embodiments described herein and can be practiced with modifications and alterations within the spirit and scope of the invention. Those skilled in the art will also recognize improvements to the embodiments of the present disclosure. All such improvements are considered within the scope of the concepts disclosed herein. Thus, the description is to be regarded as illustrative instead of limiting.

I claim:

1. A method comprising:
receiving documents, via a processor, the documents associated with a source application providing the documents and a destination application to receive the documents;
determining whether to transmit the documents to a chunking system based upon characteristics of the destination application, wherein the characteristics of the destination application comprise any of a volume of documents previously transmitted to the destination application in a relevant period of time; information about one or more queues associated with the destination application, priority information of the documents in the one or more queues, priority information associated with the documents, whether chunks are being prepared for transmission, and/or the time one or more chunks were sent;

for documents transmitted to the chunking system, generating one or more chunks as a collection of documents including the documents;

determining a destination threshold of the destination application representing a maximum volume the destination application can receive;

determining using one or more of the characteristics of the destination application and attributes of the one or more chunks that the maximum volume was not reached; and for documents transmitted to the chunking system, transmitting the one or more chunks to the destination application based on the one or more characteristics of the destination application and attributes of the one or more chunks.

2. The method of claim 1, comprising:

transmitting a message to the source application indicating that the documents have been transmitted to the destination application.

3. The method of claim 2, wherein the receiving the documents includes storing the documents in a bucket priority queue.

4. The method of claim 1, wherein the documents include a priority and storing the documents in a bucket priority queue in accordance to the priority of the documents.

5. The method of claim 1, wherein generating the one or more chunks is performed by the chunking system.

6. The method of claim 5, wherein determining to the send the documents to the chunking system includes identifying the one or more characteristics of the destination application and the destination threshold of the destination application.

7. The method of claim 6, wherein the maximum volume is a number of documents which can be received in one request.

8. The method of claim 6, wherein the maximum volume is a data size.

9. The method of claim 5, wherein one or more chunks are generated in accordance with an order defined by a document of the received documents in relation to another document of the received documents.

10. The method of claim 9, wherein transmitting the one or more chunks includes transmitting the one or more chunks in accordance with the order defined by the documents.

11. An electronic device, comprising:

a processor; and memory storing instructions, wherein the processor is configured to execute the instructions such that the processor and memory are configured to:

receive documents, the documents associated with a source application providing the documents and a destination application to receive the documents;

determine whether to transmit the documents to a chunking system based upon characteristics of the destination application, wherein the characteristics of the destination application comprise any of a volume of documents previously transmitted to the destination application in a relevant period of time: information about one or more queues associated with the destination application, priority information of the documents in the one or more queues, priority information associated with the documents, whether chunks are being prepared for transmission, and/or the time one or more chunks were sent;

for documents transmitted to the chunking system, generate one or more chunks as a collection of documents including the documents;

determine a destination threshold of the destination application representing a maximum volume the destination application can receive;

determine using one or more of the characteristics of the destination application and attributes of the one or more chunks that the maximum volume was not reached; and for documents transmitted to the chunking system, transmit the one or more chunks to the destination application based on the one or more characteristics of the destination application and attributes of the one or more chunks.

12. The electronic device of claim 11, wherein the processor and memory are configured to transmit a message to the source application indicating that the documents have been transmitted to the destination application.

13. The electronic device of claim 12, wherein receiving the documents includes storage of the documents in a bucket priority queue.

14. The electronic device of claim 11, wherein the documents includes a priority and storing the documents in a bucket priority queue in accordance to the priority of the documents.

15. The electronic device of claim 11, wherein generating the one or more chunks is performed by the chunking system.

16. The electronic device of claim 15, wherein determining to the send the documents to the chunking system includes identifying one or more characteristics of the destination application and the destination threshold of the destination application.

17. The electronic device of claim 16, wherein the maximum volume is a number of documents which can be received in one request.

18. The electronic device of claim 16, wherein the maximum volume is a data size.

19. The electronic device of claim 15, wherein the one or more chunks are generated in accordance with an order defined by a document of the received documents in relation to another document of the received documents.

20. The electronic device of claim 19, wherein transmitting the one or more chunks includes transmitting the one or more chunks in accordance with the order defined by the documents.

21. The method of claim 1, further comprising:

when it is identified that a document is high priority, the destination threshold has not been reached, and one or more queues associated with the destination application do not include high priority documents, transmitting the document to the destination application and not to the chunking system.

22. The method of claim 1, further comprising:

when it is identified that a document is high priority, the destination threshold has not been reached, and one or more queues associated with the destination include high priority documents, transmitting the document to the chunking system.

23. The electronic device of claim 11, further comprising:

when it is identified that a document is high priority, the destination threshold has not been reached, and one or more queues associated with the destination application do not include high priority documents, transmitting the document to the destination application and not to the chunking system.

24. The electronic device of claim 11, further comprising:
when it is identified that a document is high priority, the destination threshold has not been reached, and one or more queues associated with the destination include high priority documents, transmitting the document to the chunking system.

* * * * *